US006530265B2

(12) United States Patent
Dawson et al.

(10) Patent No.: US 6,530,265 B2
(45) **Date of Patent: *Mar. 11, 2003**

(54) SMALL/GROSS LEAK CHECK

(75) Inventors: Gary D. Dawson, Rochester; William B. Blomquist, Lake Orion; Chris J. Booms, Milford; Fadi S. Kanafani, Rochester, all of MI (US)

(73) Assignee: DaimlerChrysler Corporation, Auburn Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/385,252

(22) Filed: Aug. 30, 1999

(65) Prior Publication Data

US 2001/0042399 A1 Nov. 22, 2001

(51) Int. Cl.[7] .................................... G01M 3/04

(52) U.S. Cl. .................... 73/49.7; 73/40.5 R; 73/118.1; 707/51

(58) Field of Search .............................. 73/49.7, 118.1, 73/40.5 R; 123/520; 702/51

(56) References Cited

U.S. PATENT DOCUMENTS 5,191,870 A * 3/1993 Cook ......................... 123/520
5,261,379 A * 11/1993 Lipinski et al. ............. 123/520
5,263,462 A * 11/1993 Reddy ........................ 123/520
5,275,144 A * 1/1994 Gross ......................... 123/520
5,437,257 A * 8/1995 Giacomazzi et al. ........ 123/520
5,467,641 A * 11/1995 Williams et al. ............. 73/49.7
5,490,414 A * 2/1996 Durschmidt et al. ......... 73/49.2
5,495,749 A 3/1996 Dawson et al.
5,572,981 A * 11/1996 Pfleger et al. .............. 123/698
5,606,121 A * 2/1997 Blomquist et al. ......... 73/118.1
5,614,665 A * 3/1997 Curran et al. .............. 73/118.1
5,616,836 A 4/1997 Blomquist et al.
5,635,630 A 6/1997 Dawson et al.
5,637,788 A * 6/1997 Remboski et al. ....... 73/40.5 R
5,641,899 A 6/1997 Blomquist et al.
5,651,350 A 7/1997 Blomquist et al.
5,685,279 A 11/1997 Blomquist et al.
5,715,799 A * 2/1998 Blomquist et al ........... 123/520
5,878,727 A * 3/1999 Huls .......................... 123/520
5,975,062 A * 11/1999 Bonse et al. ................ 123/519
6,073,487 A * 6/2000 Dawson ...................... 73/118.1
6,082,189 A * 7/2000 Bayerle et al. ............ 73/118.1
6,089,081 A * 7/2000 Cook et al. ................ 73/118.1

* cited by examiner

*Primary Examiner*—Hezron Williams
*Assistant Examiner*—Charles D. Garber
(74) *Attorney, Agent, or Firm*—Edwin W. Bacon, Jr.

(57) ABSTRACT

A method is provided for detecting a small or gross leak in an evaporative emission control system of an automotive vehicle. The method includes initially purging and then sealing the evaporative emission control system. A vacuum switch coupled to the evaporative emission control system is then monitored for an opening event caused by a loss of a natural vacuum created in the evaporative emission control system. If said opening event is detected, the method determines if a leak check timer has exceeded a first or second predetermined threshold value. If the leak check timer has not exceeded said first predetermined threshold value a first fault code is set indicating that the gross leak has been detected. If the leak check timer has not exceeded the second predetermined threshold value, a second fault code is set indicating that the small leak has been detected. The first threshold value corresponds to an amount of time required for a leak to be detected having a diameter of about 0.070 inches or greater. The second threshold value corresponds to an amount of time required for a leak to be detected having a diameter of about 0.040 inches or greater.

18 Claims, 7 Drawing Sheets

SMALL/GROSS LEAK CHECK

BACKGROUND OF THE INVENTION

1. Technical Field

The present invention generally relates to evaporative emission control systems for automotive vehicles and, more particularly, to a leak detection assembly and a method of determining if a leak is present in an evaporative emission control system of an automotive vehicle.

2. Discussion

Modern gasoline powered automotive vehicles typically include a fuel tank and an evaporative emission control system that collects fuel vapors generated in the fuel tank. The evaporative emission control system includes a vapor collection canister, usually containing activated carbon, to collect and store fuel vapors. The canister collects fuel vapors which are displaced from the fuel tank during refueling of the automotive vehicle or from increases in fuel temperature.

The evaporative emission control system also includes a purge valve between the intake manifold of the engine and the canister. When conditions are conducive to purging, a controller opens the purge valve a predetermined amount to purge the canister. That is, the collected fuel vapors are drawn into the intake manifold from the canister for ultimate combustion within the engine.

It has recently become desirable to check evaporative emission control systems for leaks. To this end, on board vehicle diagnostic systems have been developed to determine if a leak is present in a portion of the evaporative emission control system. One such diagnostic method utilizes negative pressurization to check for leaks. In this method, a vent valve is used to seal the canister vent, a sensor to monitor system pressure, and a purge valve to draw a vacuum on the evaporative emission control system. As the vacuum is drawn, the method monitors whether a loss of vacuum occurs within a specified period of time. If so, a leak is presumed to be present.

Diagnostic systems also exist for determining the presence of a leak in an evaporative emission control system which utilize positive pressurization rather than negative pressurization. In positive pressurization systems, the evaporative emission control system is pressurized to a set pressure, typically through use of an air pump. Thereafter, a sensor detects whether a loss of pressure occurs over a certain amount of time.

While positive and negative pressurization systems are useful, there is room for improvement in the art. For instance, it would be desirable to provide a leak detection system which does not require either positive or negative pressurization of the system from an outside source. Additionally, it would be desirable to provide a leak detection system which functions when the vehicle is not operating. This would eliminate many of the complicated issues which make leak detection on an operating vehicle very difficult.

SUMMARY OF THE INVENTION

It is one object of the present invention to provide a leak detection assembly for use in testing the integrity of an evaporative emission control system for an automotive vehicle.

It is another object of the present invention to provide a leak detection method having a device for sealing the evaporative emission control system such that an internal pressure thereof is isolated from external influences.

It is yet another object of the present invention to provide a leak detection method having a device for monitoring the internal pressure of the evaporative emission control system after it has been sealed such that very small, moderate, and large leaks may be separately detected by noting if the pressure within the sealed evaporative emission control system goes below atmospheric pressure over predetermined periods of time as the evaporative emission control system components cool.

It is still yet another object of the present invention to provide a leak detection method for testing the rationality of the device used for monitoring the internal pressure of the evaporative emission control system.

It is another object of the present invention to provide a leak detection method for periodically cleaning the device for sealing the evaporative emission control system.

Some of the above and other objects are provided by a method of detecting a small or gross leak in an evaporative emission control system of an automotive vehicle. The method includes initially purging and then sealing the evaporative emission control system. A vacuum switch coupled to the evaporative emission control system is then monitored for an opening event caused by a loss of a vacuum created in the evaporative emission control system. If said opening event is detected, the method determines if a leak check timer has exceeded a first or second predetermined threshold value. If the leak check timer has not exceeded said first predetermined threshold value a first fault code is set indicating that a gross leak has been detected. If the leak check timer has not exceeded the second predetermined threshold value, a second fault code is set indicating that a small leak has been detected. The first threshold value corresponds to an amount of time required for a leak to be detected having a diameter of about 0.070 inches or greater. The second threshold value corresponds to an amount of time required for a leak to be detected having a diameter of about 0.040 inches or greater.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards a method of leak detection for an evaporative emission control system to determine if a leak is present in a portion of the system. The method is based on the principle that upon cooling of evaporative emission control system components, the internal pressure of the sealed evaporative emission control system should go negative (less than atmospheric). However, if a sufficient leak is present in a portion of the system, the internal pressure will not go negative. By monitoring the sealed system for changes in internal pressure while cooling, a potential leak can be identified.

Figure 1:
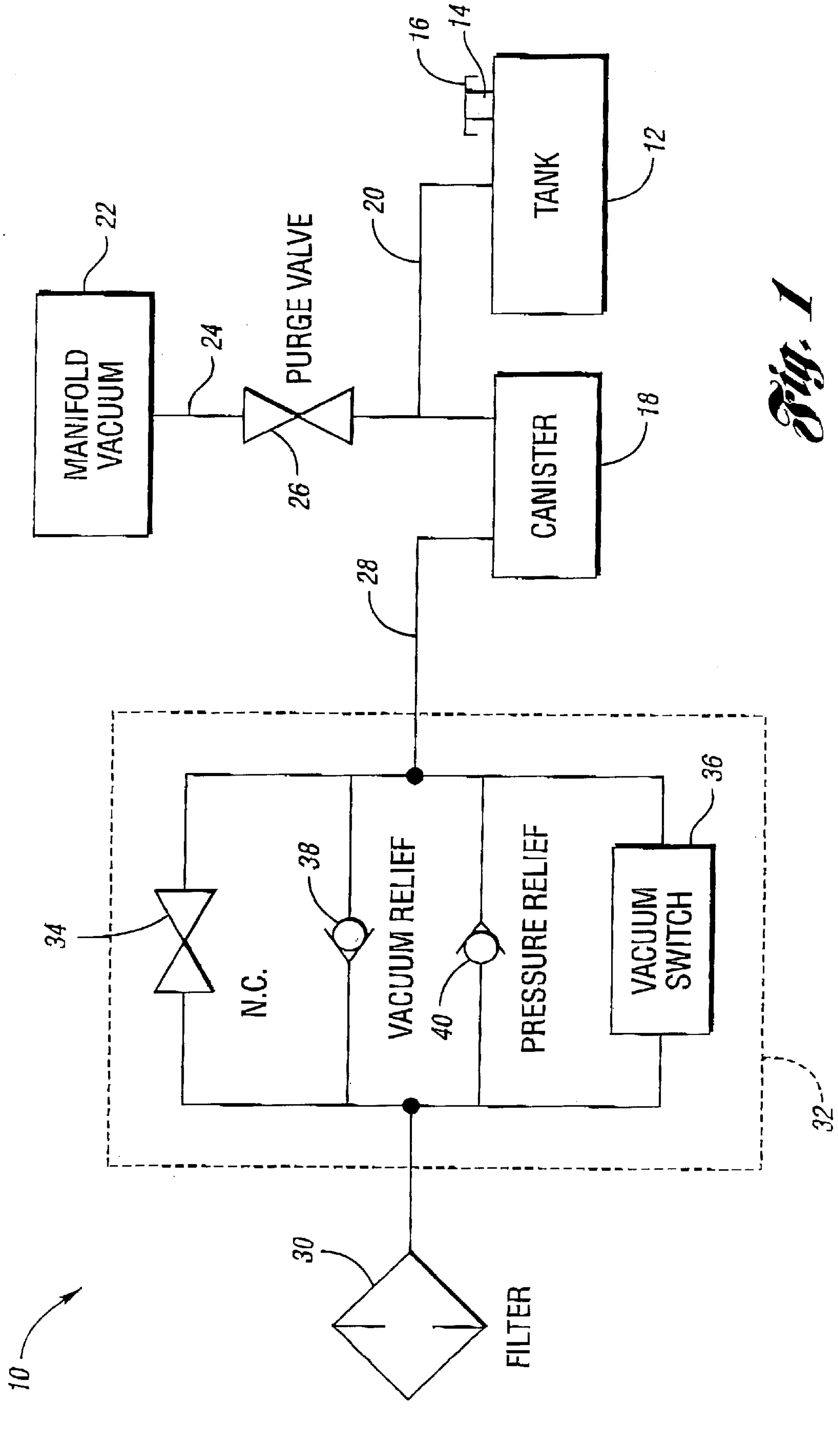
FIG. 1 is a schematic diagram of an evaporative emission control system according to the present invention.

Turning now to the drawing figures, FIG. 1 illustrates an evaporative emission control system 10 for an automotive vehicle according to the present invention. The control system 10 includes a fuel tank 12 including a fuel fill tube 14 which is sealed by a cap 16. The fuel tank 12 is fluidly coupled to a carbon filled canister 18 by a fuel tank vapor conduit 20. The canister 18 is fluidly coupled to an intake manifold 22 by a canister vapor conduit 24. A solenoid activated purge valve 26 is disposed along the conduit 24 for selectively isolating the canister 18 and fuel tank 12 from the manifold 22.

A vent line 28 is coupled to the canister 18 and terminates at a filter 30 which communicates with the atmosphere. A natural vacuum leak detection assembly 32 is disposed along the vent line 28 between the canister 18 and the atmosphere. Although the components of the natural vacuum leak detection assembly are illustration in parallel, one skilled in the art will appreciate that a serial orientation of the components may also be employed. Further, all three components (34, 38, 40) may be combined into a single device.

The natural vacuum leak assembly 32 includes a leak detection solenoid operated valve 34 for selectively isolating the canister 18 and fuel tank 12 from the atmosphere. A vacuum switch 36 is provided for monitoring the pressure within the evaporative emission control system 10. A vacuum relief valve 38 is provided for preventing any vacuum within the evaporative emission control system 10 from exceeding a pre-selected threshold. Similarly, a pressure relief valve 40 is provided for preventing the pressure within the evaporative emission control system 10 from exceeding a pre-selected threshold value.

In operation, the valve 34 seals the canister vent line 28 during engine-off conditions. If the evaporative emission control system 10 is free of leaks, the pressure within the system 10 will go negative due to either cool down from operating temperatures or during diurnal ambient temperature cycling. When the vacuum in the system 10 exceeds a vacuum threshold such as about one inch H2O (0.25 KPA), the vacuum switch 36 closes. The closure of vacuum switch 36 causes a signal to be sent to a controller (not shown). The controller utilizes the switch signal or lack thereof to make a determination as to whether a leak is present.

If the vacuum in the system 10 exceeds a second vacuum threshold such as three to six inches H2O or 0.75 to 1.5 KPA, the vacuum relief valve 38 will pull off its valve seat thereby opening the seal. This provides protection of the system from excessive vacuum as well as allowing sufficient purge flow in the event that the valve 34 becomes inoperative. The pressure relief valve 40 will lift off of its valve seat at about one inch H2O (0.25 KPA) pressure. This is particularly advantageous during a refueling event. An added benefit to this is that the pressure relief valve 40 also allows the tank 12 to breath out during increasing temperature events and thus limits the pressure in the tank 12 to this low level. This is also important during vacuum detection since the vacuum switch 36 will close predictably upon a declining temperature condition as opposed to what might occur if the system 10 had to decay from a heightened pressure.

As will be described in greater detail below, the controller registers a closing event of the vacuum switch 36 during an engine-off event. If a closure event is detected, the controller logs this event and the time period since key-off. This information is processed again when the engine is restarted. If desired, acceptance of the switch closure event can be delayed until a predetermined time period after key-off to ensure that the system 10 is sufficiently stable and the closure event is reliable.

Figure 2:
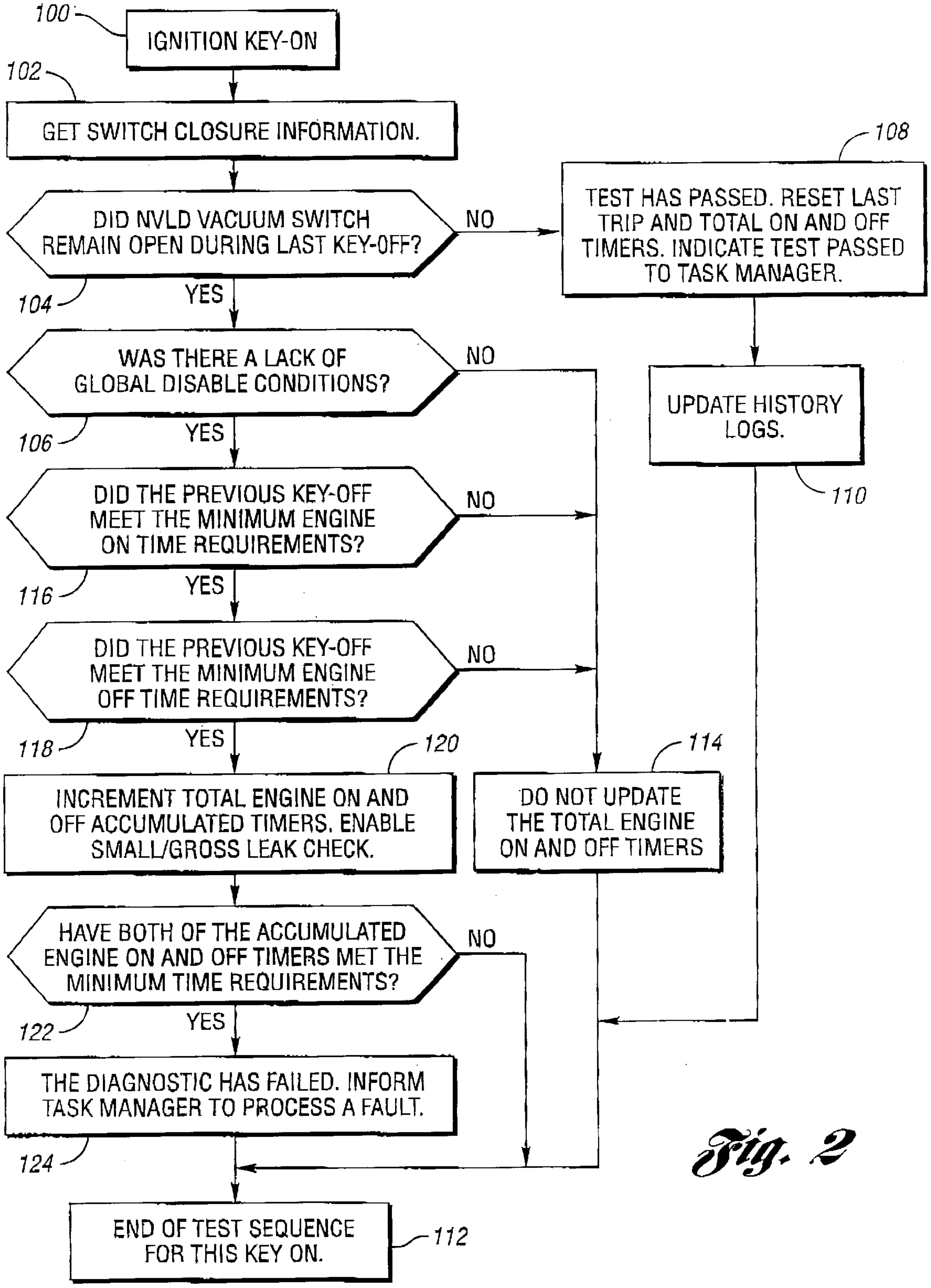
FIG. 2 is a flowchart depicting a method of detecting a very small leak in an evaporative emission control system according to the present invention.

Referring now to FIG. 2, a method for detecting a very small leak in the evaporative control system is illustrated. For example, this method will detect leaks less having a diameter of about 0.020 inches or greater. The method starts in block 100 at an ignition key-on event. After start-up at block 100, the methodology continues to block 102. In block 102, the methodology retrieves information regarding the open or closed state of the vacuum switch. From block 102, the methodology advances to decision block 104.

In decision block 104, the methodology determines whether the vacuum switch remained open after the last key-off event. If the vacuum switch remained open at decision block 104 a leak may be present. As such, the methodology advances to decision block 106. However, if the vacuum switch closed during the last key-off event there is likely no leak. Accordingly, the methodology advances to block 108.

In block 108, the methodology recognizes that no leak was present in the system after the last key-off event. As such, the methodology resets a last trip timer and a total on and off timer. The last trip timer accumulates the amount of time spent during the last ignition on operating condition or the last ignition off inoperative condition. The total on and off timers tabulate a pre-selected series of trip times. More particularly, four timers are employed in accordance with this methodology. An individual trip engine-on timer accumulates the time for an individual trip. An individual trip engine-off timer accumulates the time for an individual engine-off event. A total trip engine-on timer accumulates a series of individual trip engine-on times. A total trip engine-off timer accumulates a series of individual trip engine-off times. Only trips which meet certain criteria (i.e., trips that are long enough to ensure reliability) count towards the total time. The total timers are used for determining a system failure.

From block 108, the methodology advances to block 110. In block 110, the methodology updates the history logs. The history logs record the totals of the last trip and total on and off timers. From block 110, the methodology advances to block 112. In block 112, the methodology ends the test sequence for this key-on event.

Referring again to decision block 106, after determining that the vacuum switch remained open during the last key-off event at decision block 104, the methodology determines whether there was a lack of global disabling conditions. Global disable conditions include minimum and maximum ambient temperatures (e.g., 40° and 120°), minimum and maximum fuel levels (e.g., 15% and 85%), minimum and maximum battery voltage (e.g., 9 v and 24 v), and maximum altitude (e.g., 8500 feet). If there is no lack of a global disable condition (i.e., a global disable condition exists) the methodology advances from decision block 106 to block 114. At block 114, the methodology bypasses any updating of the total engine on and off timers. From block 114, the methodology advances to block 112 and ends the test sequence for this key-on event.

Referring again to decision block 106, if there is a lack of global disable conditions (i.e., no global disable condition exists), the methodology advances to decision block 116. In decision block 116, the methodology determines whether the operating time prior to the previous key-off event meets the minimum engine-on time requirements. The minimum engine-on time requirements are preferably about ten minutes which ensures that the engine has gone through a complete warm up cycle. If the operating time prior to the previous key-off event does not meet the minimum engine-on time requirements, the methodology advances through block 114 (where it bypasses any update of the total engine on and off timers) and continues to block 112 to end the test sequence for this key-on event. However, if the operating time prior to the previous key-off event meets the minimum on-time requirements at decision block 116, the methodology advances to decision block 118.

In decision block 118, the methodology determines whether the previous key-off event meets the minimum engine-off time requirements. The minimum engine-off time requirements are preferably about ten minutes which ensures that the pressure within the system has stabilized. If the previous key-off event does not meet the minimum engine-off time requirements, the methodology advances through block 114 (where any update of the total engine on and off timers is bypassed) and continues to block 112 to end the test sequence for this key-on event. However, if the previous key-off event meets the minimum off time requirements at decision block 118, the methodology advances to block 120.

In block 120, the methodology increments the total engine on and off accumulated timers and enables the small/gross leak check testing sequence (described below). The total engine on and off accumulated timers are incremented with the trip timer described above. From block 120, the methodology advances to decision block 122.

In decision block 122, the methodology determines whether both of the accumulated engine on and off timers meet pre-selected minimum time requirements. The minimum time requirements correspond to an amount of time required for the pressure within the system to change over time due to a very small leak. Such a minimum time requirement may be on the order of a week (168 hours) or longer. This length of time is selected because the vehicle will have been exposed to the largest possible drive scenarios before a leak decision is made. Further, most vehicles experience both daily commuting and weekend excursions during this time period. If both of the accumulated engine on and off timers do not meet the minimum time requirements, the methodology advances to block 112 and ends the test sequence for this key-on event. However, if both of the accumulated engine on and off timers meet the minimum time requirements at decision block 122, the methodology advances to block 124.

In block 124, the methodology recognizes that the evaporative emission control system has failed the very small leak test. This is indicated in the controller by setting a fault code which will convey to a service technician the nature of the problem and may also activate a warning lamp. From block 124, the methodology continues to block 112 and ends the test sequence for this key-on event.

Figure 3A:
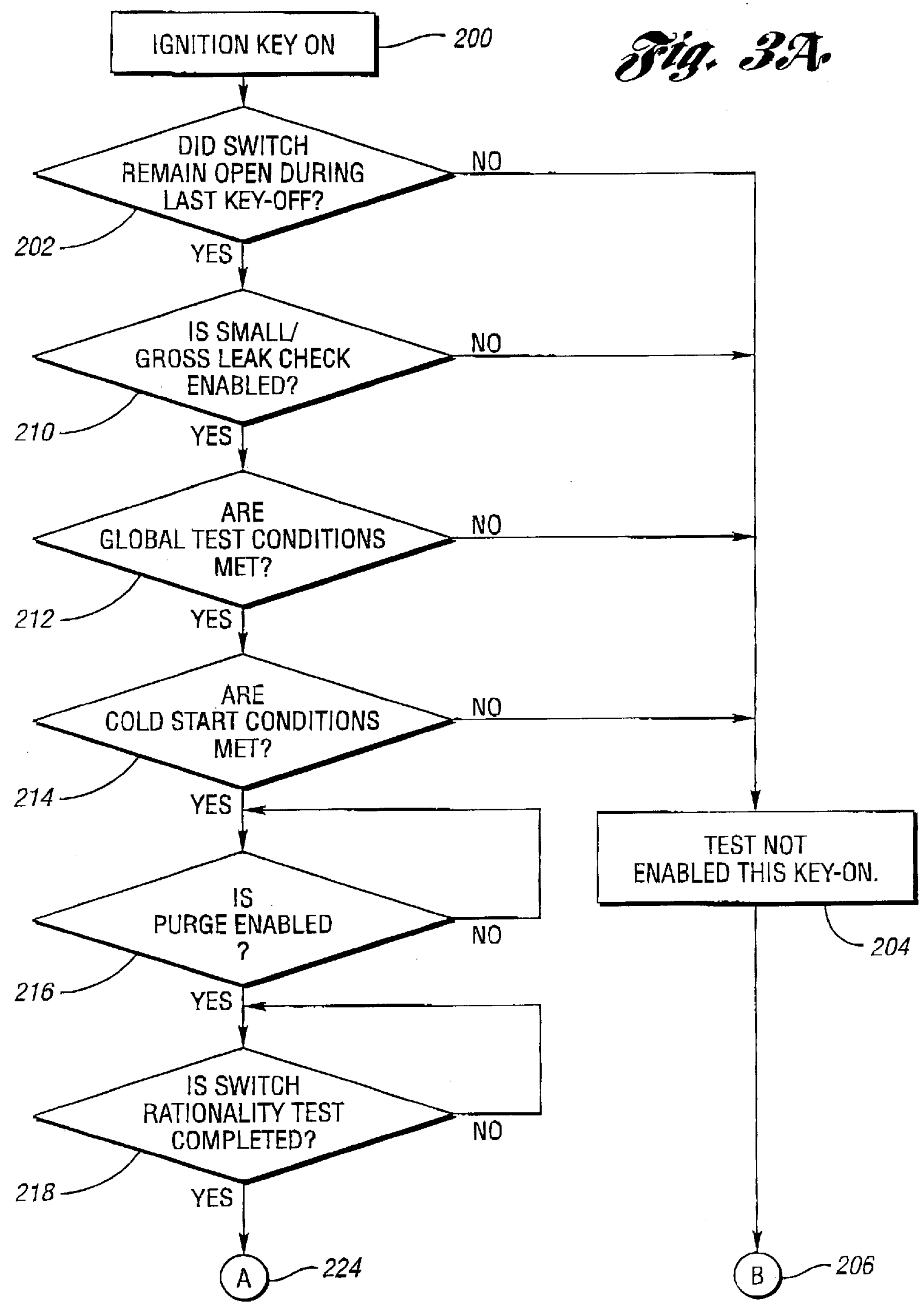
FIGS. 3A, 3B, and 3C are a flowchart depicting a method of detecting a small or large leak in an evaporative emission control system according to the present invention.
Figure 3B:
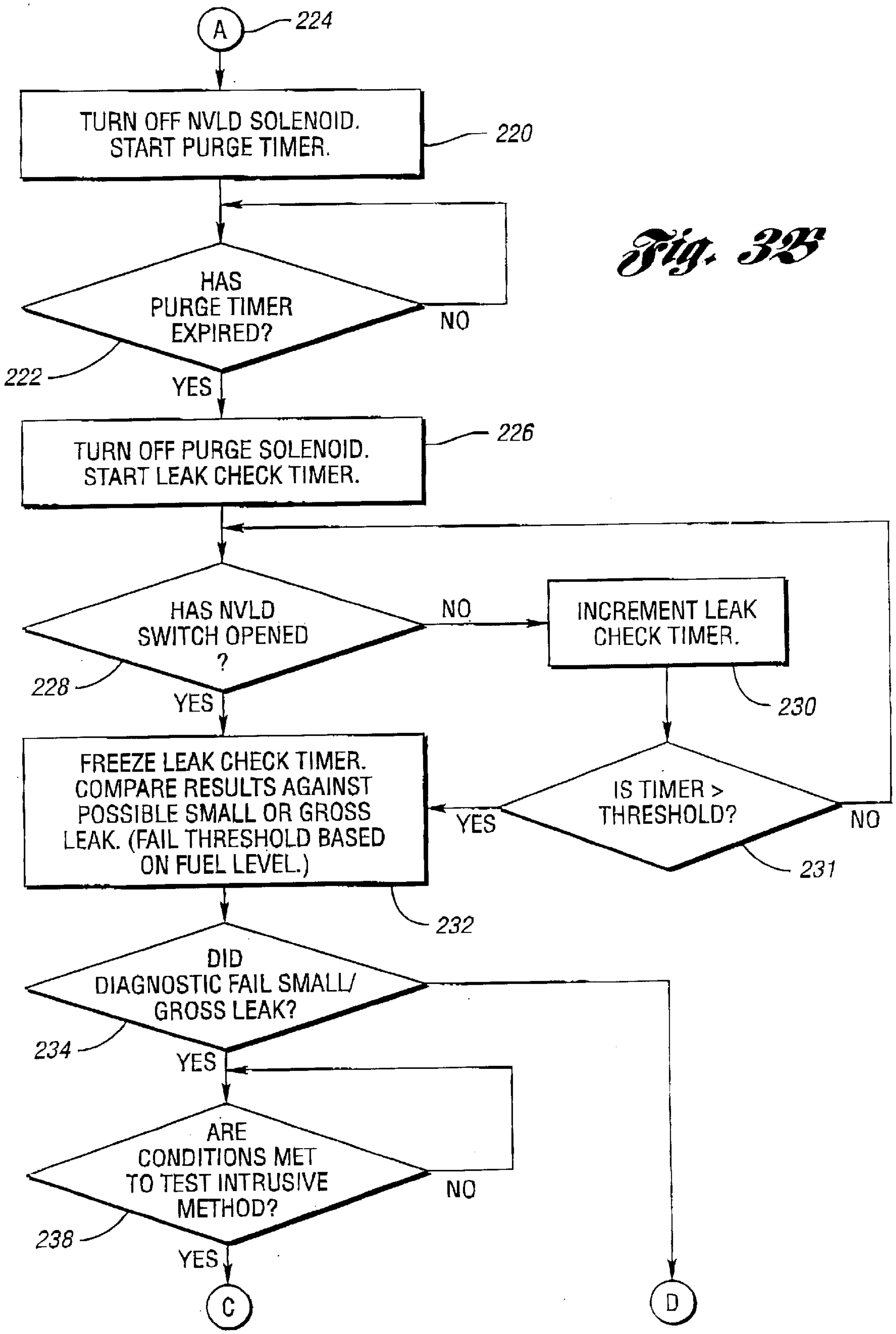
Figure 3C:
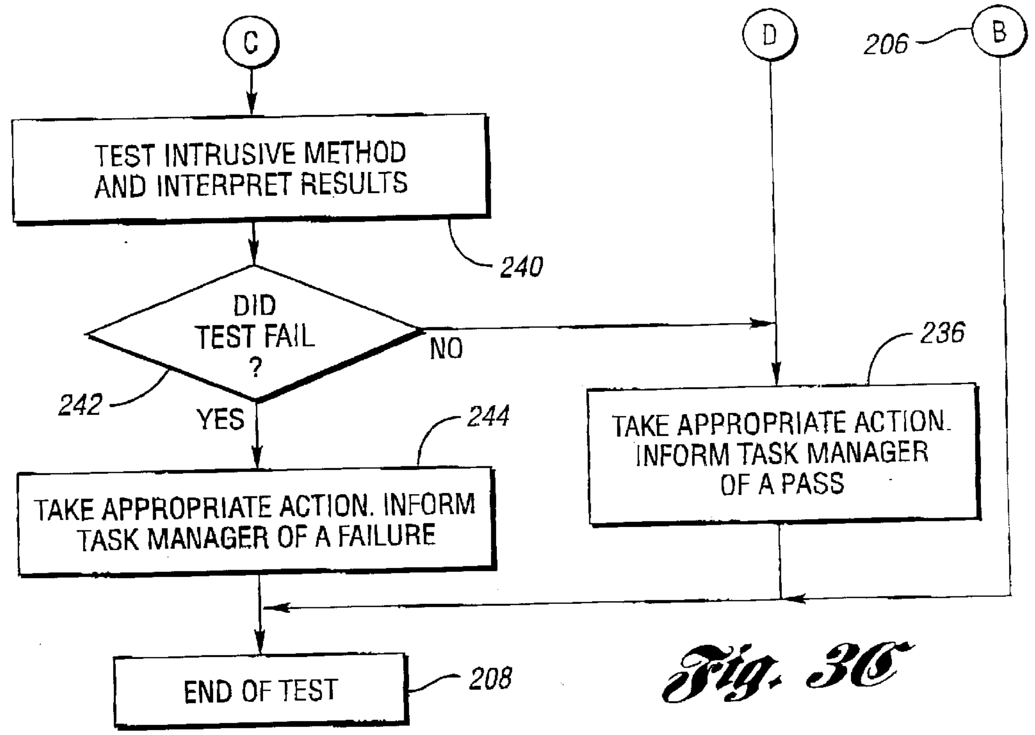

Turning now to FIGS. 3A, 3B and 3C, a methodology for determining a small or gross leak in the evaporative emission control system is illustrated. For example, a small leak having a diameter of about 0.040 inches or greater, or a gross leak having a diameter of about 0.070 inches or greater including a cap off or disconnected hose can be detected. The methodology starts in block 200 at an ignition key-on event. From block 200, the methodology continues to decision block 202.

In decision block 202, methodology determines whether the vacuum switch remained open during the last key-off event. If the switch did not remain open after the last key-off event (i.e., the switch closed and no leak is likely present) the methodology advances from decision block 202 to block 204. In block 204, the methodology recognizes that the small/gross leak check is not enabled at this key-on event. From block 204, the methodology continues through connector 206 to block 208 where the methodology ends the test sequence.

However, if the vacuum switch remained open during the last key-off event at decision block 202, the methodology advances to decision block 210. In decision block 210, the methodology determines if the small/gross leak check is enabled. This event would have occurred at block 120 of FIG. 2. If the small/gross leak check is not enabled at decision block 210, the methodology advances by way of block 204 and connector 206 to block 208 and ends the test sequence. However, if the small/gross leak check is enabled at decision block 210, the methodology advances to decision block 212.

In decision block 212, the methodology determines whether certain global test conditions are met. These global test conditions are discussed above regarding block 106 of FIG. 2. If the global test conditions are not met at decision block 212, the methodology advances through block 204 and connector 206 to block 208 and ends the test sequence. However, if the global test conditions are met at decision block 212, methodology advances to decision block 214.

In decision block 214, the methodology determines whether the cold start conditions are met. The cold start conditions include a determination that the coolant temperature is within a pre-selected amount of ambient temperature to ensure that the fuel system is stable for testing. If the cold start conditions are not met at decision block 214, the methodology advances through block 204 and connector 206 to block 208 to end the test sequence. However, if the cold start conditions are met at decision block 214, the methodology advances to decision block 216.

In decision block 216, the methodology determines whether purging of the evaporative emission control system is enabled. If not, the methodology waits at decision block 216 until such purge enablement is established. After purge has been enabled at decision block 216, the methodology advances to decision block 218.

In decision block 218, the methodology determines whether the switch rationality test (described below) is complete. If not, the methodology waits at decision 218 until such rationality test is complete. After the switch rationality test is started or completed at decision block 218, the methodology continues to block 220.

In block 220, the methodology turns off the natural vacuum leak detection solenoid which closes the valve 34 of FIG. 1. Absent a leak in the system, this isolates the evaporative emission control system from the atmosphere. At block 220, the methodology also starts a purge timer. When the purge timer expires, purging of the system is sure to be complete and a vacuum should have been created. From block 220, the methodology continues to decision block 222.

In decision block 222, the methodology determines whether the purge timer has expired. If not, the methodology waits at decision block 222 until such timer has expired. This ensures that a vacuum should have been created in the evaporative emission control system prior to continuing. Once the purge timer has expired at decision block 222, the methodology continues through connector 224 to block 226.

In block 226, the methodology closes the purge valve 26 of FIG. 1 by turning off a purge solenoid. This isolates the evaporative emission control system from the manifold and, in conjunction with the vent valve 34, ensures a completely closed system. In block 226, the methodology also starts a leak check timer. The leak check timer tabulates the amount of time it takes for the vacuum switch to open. From block 226, the methodology continues to decision block 228.

In decision block 228, the methodology determines whether the vacuum switch has opened. If the vacuum switch has not opened at decision block 228, the methodology advances to block 230. In block 230, the methodology increments the leak check timer. From block 230, the methodology continues to decision block 231. In decision block 231, the methodology determines if the leak check timer has exceeded a pre-selected threshold. The threshold corresponds to an amount of time within which a properly functioning vacuum switch would open. If the leak check timer is not greater than the threshold, the methodology returns to decision block 228 and continues this loop until the vacuum switch opens. Once the vacuum switch opens at decision block 228, the methodology continues to block 232. Further, if the leak check timer has exceeded the pre-selected threshold at decision block 231, the methodology advances to block 232.

In block 232, the methodology freezes the leak check timer and compares its total against a pre-selected threshold. A first threshold value is used for detecting gross leaks while a second, longer threshold, is used for detecting small leaks. Each threshold value is selected from a two dimensional table based on fuel level. When more fuel is present in the tank, less time is required for the volume to be exhausted. From block 232, the methodology continues to decision block 234.

In decision block 234, the methodology determines whether the evaporative emission control system failed the small/gross leak test (i.e. the leak check timer is less than one or the other fail thresholds). If the leak check timer is greater than the fail thresholds at decision block 234, the methodology advances to block 236. In block 236, the methodology recognizes that the system has passed the test and clears pending fault codes, or starts de-maturing existing full fault codes. From block 236, the methodology continues to block 208 and ends the test sequence.

Referring again to decision block 234, if the system failed the small/gross leak test (i.e., the leak check timer is less than one or the other fail thresholds), the methodology continues to decision block 238. In decision block 238, the methodology determines whether the current operating conditions are suitable to conduct an intrusive test of the evaporative emissions control system. Such conditions would enable a high vacuum to be applied to the system. If the conditions are not appropriate for intrusive testing, the methodology waits at decision block 238 until the conditions improve. Once the conditions are appropriate for intrusive testing, the methodology advances from decision block 238 to block 240.

In block 240, the methodology implements an intrusive test of the evaporative emissions control system. This test includes applying a large vacuum to the evaporative emission control system by using, for example, the purge system. Following the intrusive testing at block 240, methodology continues to decision block 242.

In decision block 242, the methodology determines whether the evaporative emissions control system failed the intrusive test. If the system does not fail (i.e., passes) the intrusive test, the methodology advances from decision block 242 through block 236 to block 208 and ends the testing. However, if the evaporative emission control system fails the intrusive test, the methodology advances from decision block 242 to block 244.

In block 244, the methodology recognizes that the system has failed and sets a pending or full fault code indicating to a service technician that the evaporative emissions control system has a small or gross leak. The fault code may also activate a warning lamp. From block 244, the methodology continues to block 208 and ends the testing.

Figure 4A:
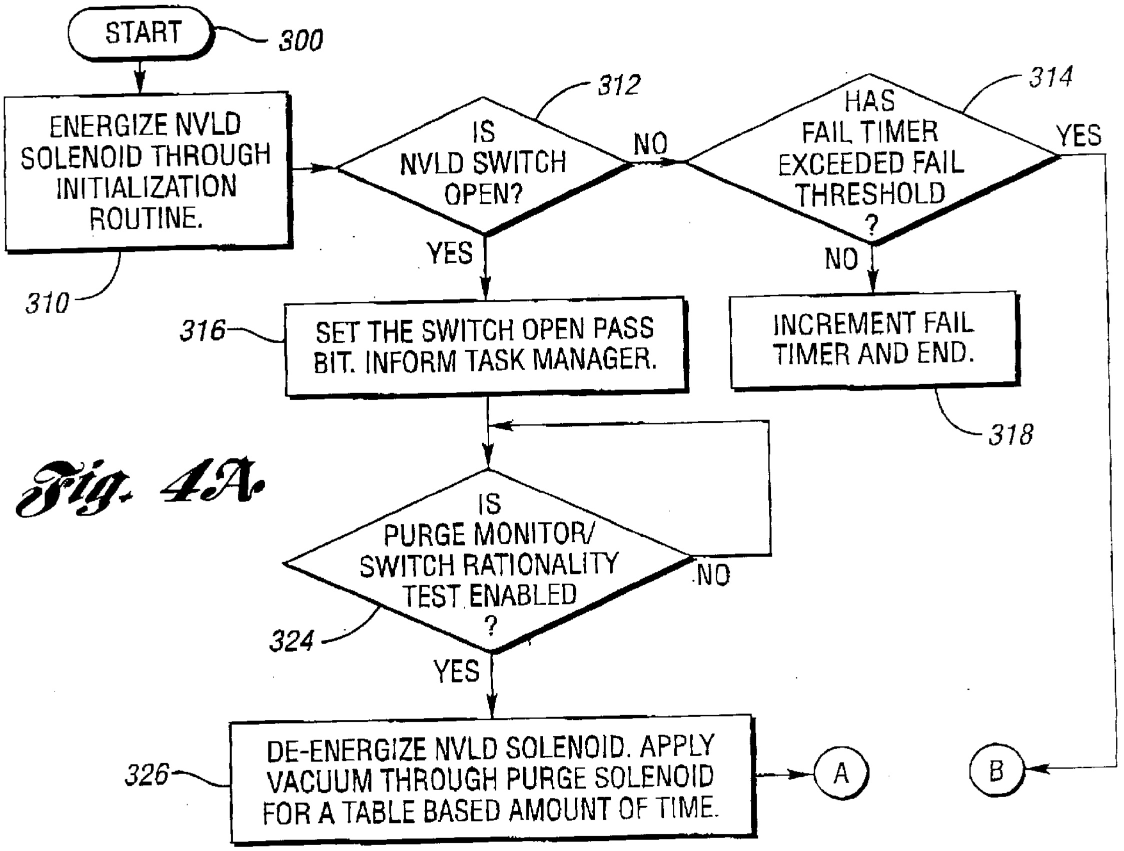
FIGS. 4A and 4B are a flowchart depicting a method of determining the rationality of the device for monitoring the internal pressure of an evaporative emission control system according to the present invention.
Figure 4B:
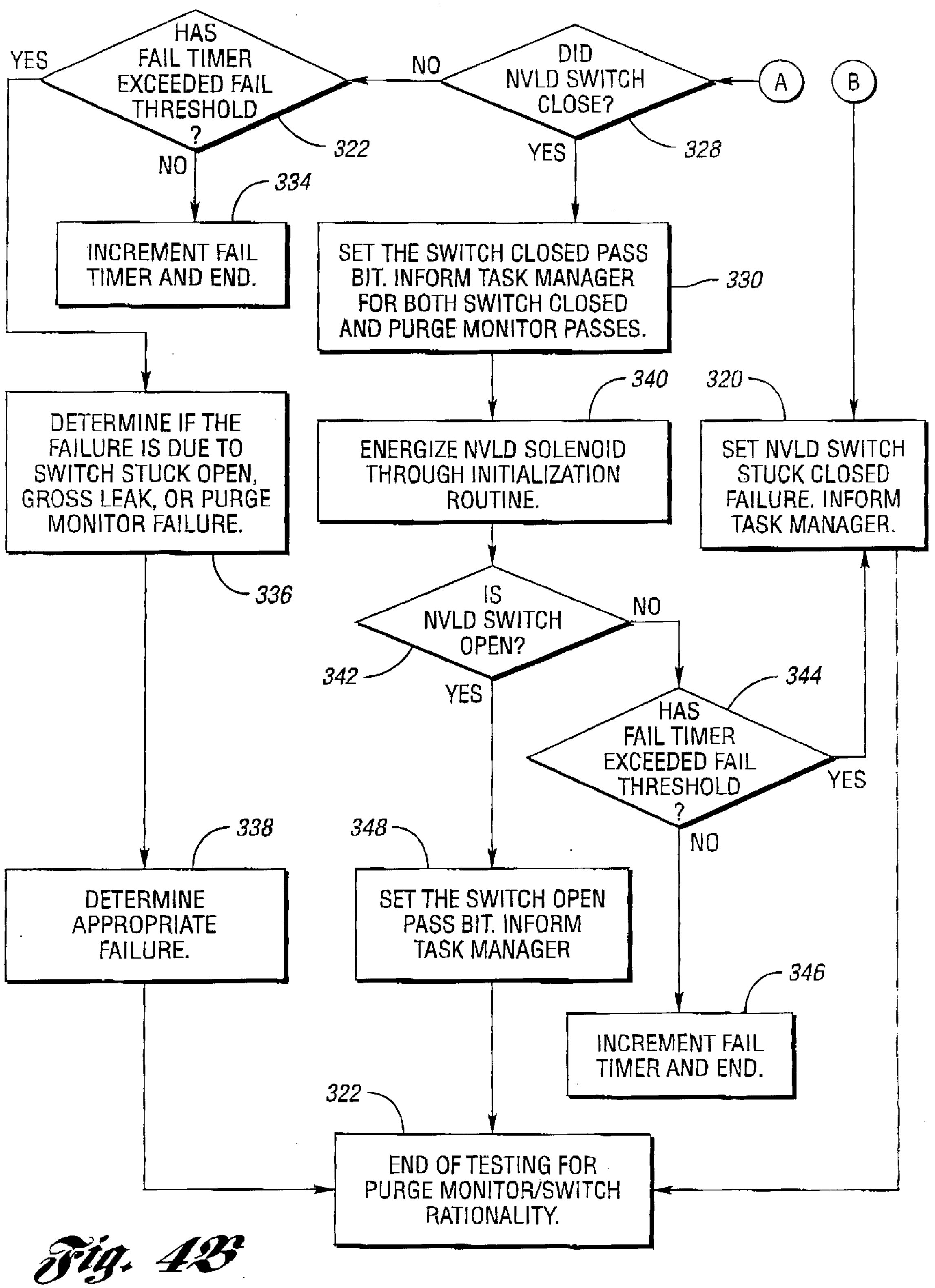

Turning now to FIGS. 4A and 4B, a methodology for checking the rationality of the vacuum switch 36 of FIG. 1 is illustrated. The methodology starts in block 300 and falls through to block 310. In block 310, the methodology opens valve 34 of FIG. 1 by energizing a natural vacuum leak detection solenoid. From block 310, the methodology continues to decision block 312.

In decision block 312, the methodology determines if the vacuum switch is open. If the vacuum switch is not open in decision block 312, the methodology advances to decision block 314. On the other hand, if the vacuum switch is open at decision block 312, the methodology advances to block 316.

In decision block 314, the methodology determines if the fail timer has exceeded a fail threshold. The fail timer sets a maximum time limit within which the vacuum switch should open. If the fail timer is less than the fail threshold, methodology continues to block 318. In block 318, the methodology increments the fail timer and ends the subroutine pending a subsequent execution thereof.

However, if the fail timer has exceeded the fail threshold at decision block 314, the methodology advances to block 320. In block 320, the methodology sets a fault code indicating to a service technician that the vacuum switch has stuck closed for some reason. The fault code may also activate a warning lamp. From block 320, the methodology advances to block 322. In block 322, the methodology ends the testing sequence for vacuum switch rationality.

Referring again to block 316, if the vacuum switch is open at decision block 312, the methodology sets a code indicating that the vacuum switch has passed the test regarding its ability to open. From block 316, the methodology continues to decision block 324.

In decision block 324, the methodology determines whether the rationality test has been enabled. This would occur when purging of the system is activated or shortly thereafter. If the vacuum switch rationality test is not enabled at decision block 324, the methodology waits until such enablement is established. Once the vacuum switch rationality test is enabled at decision block 324, the methodology continues to block 326.

In block 326, the methodology closes valve 34 of FIG. 1 by de-energizing the natural vacuum leak detection solenoid. Thereafter, a vacuum is applied to the evaporative emissions control system from the manifold 22 through the purge valve 26. The vacuum is applied for a predetermined period of time in accordance with a two-dimensional table based on fuel level or other operating conditions. After creating the vacuum in the evaporative emissions control system at block 326, the methodology continues to decision block 328.

In decision block 328, the methodology determines if the vacuum switch closed under the influence of the applied vacuum. If the vacuum switch closes at decision block 328, the methodology continues to block 330. However, if the vacuum switch does not close at decision block 328, the methodology advances to decision block 332.

In decision block 332, the methodology determines whether the fail timer has exceeded the fail threshold. If not, the methodology advances from decision block 332 to block 334. In block 334, the methodology increments the fail timer and ends the subroutine pending a subsequent execution thereof. However, if the fail timer is greater than the fail threshold at decision block 332, methodology advances to block 336.

In block 336, the methodology implements one of three routines to determine if the failure is due to the vacuum switch being stuck open, the presence of a gross leak in the evaporative emission control system, or a purge monitor failure. The purge monitor is a functional check of the purge flow through the system. From block 336, the methodology continues to block 338. In block 338, the methodology sets an appropriate fault code according to the type of failure determined at block 336. From block 338, the methodology continues to block 322 and ends the testing sequence.

Referring again to block 330, if the vacuum switch closes at decision block 328, the methodology sets a code indicating that the vacuum switch has passed the test regarding its ability to close. In block 330, the methodology also sets a code indicating that the purge monitor passed its reliability test. From block 330, the methodology advances to block 340.

In block 340, the methodology opens the valve 34 of FIG. 1 by energizing the natural vacuum leak detection solenoid. From block 340, the methodology continues to decision block 342. In decision block 342, the methodology reconfirms that the vacuum switch is open. This should have occurred when the valve 34 was opened. If the vacuum switch is not open at decision block 332, the methodology advances to decision block 344.

In decision 344, the methodology determines if the fail timer has exceeded the fail threshold. If so, the methodology advances to block 320 and sets a code indicating that the vacuum switch has stuck closed. From block 320, the methodology continues to block 322 and ends the testing sequence for vacuum switch rationality. However, if the fail timer has not exceeded the failed threshold at decision block 344, the methodology advances to block 346. In block 346, the methodology increments the fail timer and ends the subroutine pending a subsequent execution thereof.

Referring again to decision block 342, if the vacuum switch is open, the methodology advances to block 348. In block 348, the methodology resets the code indicating that the vacuum switch has passed the test regarding its ability to open. From block 348, the methodology continues to block 322 and ends the testing sequence for vacuum switch rationality.

Figure 5:
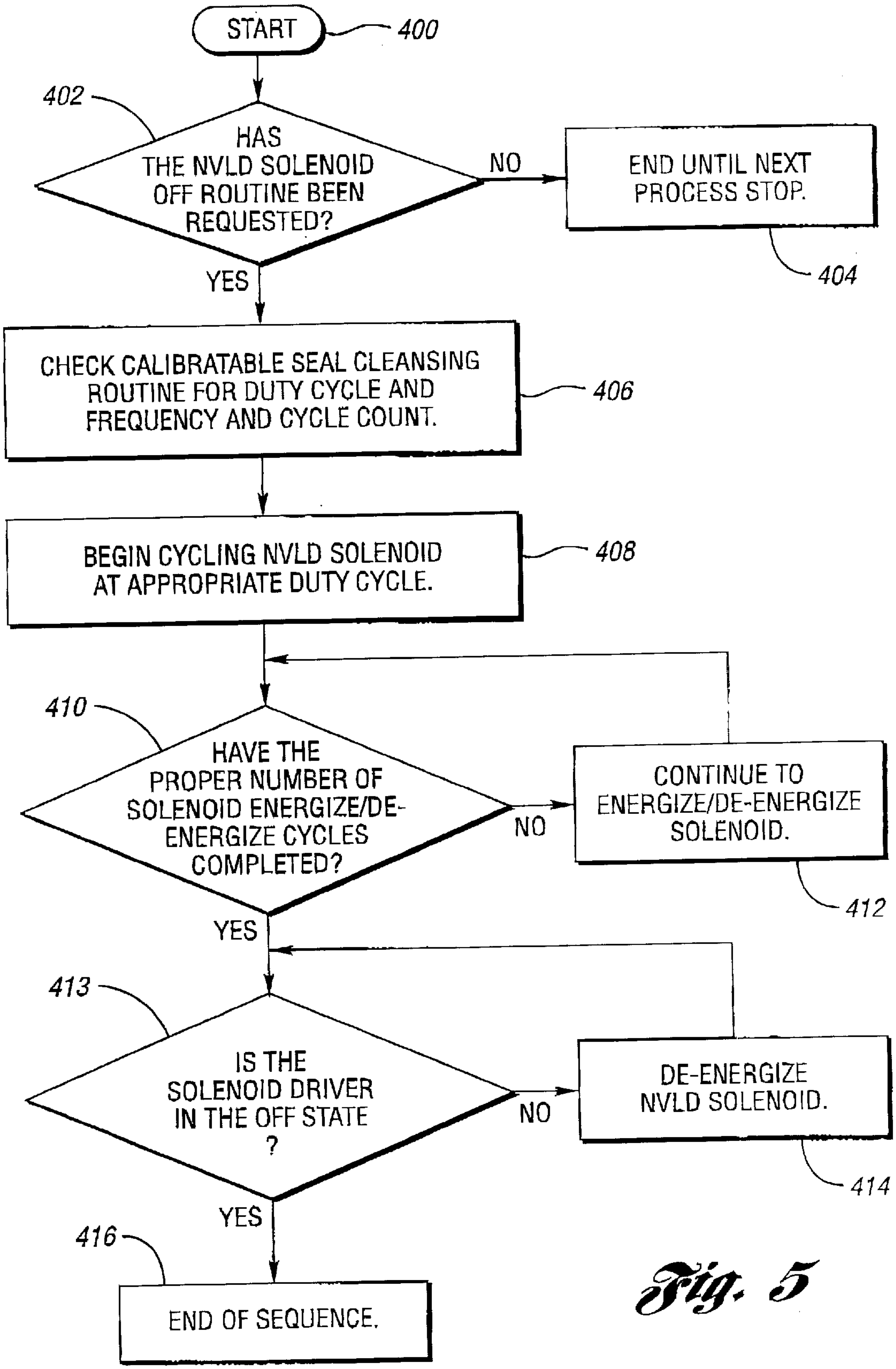
FIG. 5 is a flowchart depicting a method for periodically cleaning the device for sealing the evaporative emission control system according to the present invention.

Turning now to FIG. 5, a methodology for cleansing the valve 34 of FIG. 1 is illustrated. The valve is periodically cleaned to ensure that a complete and reliable seal is provided. The methodology starts in block 400 and falls through to decision block 402.

In decision block 402, the methodology determines if the routine for closing the valve 34 of FIG. 1 has been requested. This would occur, for example, at block 220 of FIG. 3B and block 326 of FIG. 4A. If the closing routine has not yet been requested at decision block 402, the methodology advances to block 404 and exits the subroutine until the next execution thereof. However, if the routine has been requested at decision block 402, the methodology continues to block 406.

In block 406, the methodology retrieves a duty cycle, frequency, and cycle count for the seal cleansing routine. These data are acquired from calibration tables prepared in advance for the particular solenoid employed. For example, a 50% duty cycle, 5 Hz frequency or a three cycle count can be used to insure that the seal strikes its seat about three times. From block 406, the methodology continues to block 408.

In block 408, the methodology cycles the natural vacuum leak detection solenoid at the duty cycle determined at block 406. This causes the valve 34 of FIG. 1 to press and lift off its valve seat a pre-selected number of times in a pre-selected period of time. From block 408, the methodology continues to decision block 410.

In decision block 410, the methodology determines whether the proper number of solenoid cycles have been completed. If not, the methodology advances to block 412. In block 412, the cycling of the solenoid is continued. From block 412, the methodology returns to decision block 410 and this loop is continued until the proper number of solenoid cycles have occurred. After the proper number of solenoid cycles has occurred at decision block 410, the methodology advances to decision block 413.

In decision block 413, the methodology determines whether the solenoid is in the off state (i.e. the valve 34 of FIG. 1 is closed). If not, the methodology advances to block 414 and de-energizes the natural vacuum leak detection solenoid which closes the valve. From block 414, the methodology returns to decision block 413 to ensure that the solenoid is in the off state. Once the solenoid is in the off state at decision block 413, the methodology advances to block 416. In block 416, the methodology ends the cleansing sequence pending a subsequent execution thereof.

Thus, the present invention provides a unique method of leak detection for an evaporative emission control system. Additionally, the present invention provides a method for testing the rationality of a vacuum switch used to monitor the pressure within the system. The present invention also provides a method for cleansing the seal on the valve used to close the system.

What is claimed is:

1. A method of detecting a small or gross leak in an evaporative emission control system of an automotive vehicle comprising:

purging said evaporative emission control system;

determining that a vacuum switch coupled to said evaporative emission control system is reliable then sealing said evaporative emission control system;

monitoring said vacuum switch for an opening event due to a loss of a natural vacuum created in said evaporative emission control system;

determining if a leak check timer has exceeded a first or second predetermined threshold value if said opening event is detected; and setting a first fault code indicating that said gross leak has been detected if said leak check timer has not exceeded said first predetermined threshold value and setting a second fault code indicating that said small leak has been detected if said leak check timer has not exceeded said second predetermined threshold value.

2. The method of claim 1 wherein said first threshold value corresponds to an amount of time required for a leak to be detected having a diameter of about 0.070 inches or greater.

3. The method of claim 2 wherein said first threshold value is dependent upon a level of fuel in a fuel tank of said automotive vehicle.

4. The method of claim 1 wherein said second threshold value corresponds to an amount of time required for a leak to be detected having a diameter of about 0.040 inches or greater.

5. The method of claim 4 wherein said second threshold value is dependent upon a level of fuel in a fuel tank of said automotive vehicle.

6. The method of claim 1 further comprising determining that a minimum inoperative time has elapsed prior to said step of sealing said evaporative emission control system.

7. The method of claim 1 further comprising determining that a set of operating conditions are met prior to said step of sealing said evaporative emission control system.

8. The method of claim 7 wherein said set of operating conditions further comprise that an ambient temperature is between a minimum and maximum ambient temperature.

9. The method of claim 7 wherein said set of operating conditions further comprise that a fuel level is between a minimum and maximum fuel level.

10. The method of claim 7 wherein said set of operating conditions further comprise that a battery voltage is between a minimum and maximum battery voltage.

11. The method of claim 7 wherein said st of operating conditions further comprise that an altitude is less than a maximum altitude.

12. The method of claim 1 wherein said step of purging said evaporative emission control system further comprises shutting a valve disposed along a first conduit extending between a canister of said evaporative emission control system and atmosphere and drawing a vacuum on said evaporative emission control system with a manifold of said automotive vehicle.

13. The method of claim 1 wherein said step of sealing said evaporative emission control system further comprises shutting a first valve disposed along a first conduit extending between a canister of said evaporative emission control system and atmosphere, and shutting a second valve disposed along a second conduit extending between a canister of said evaporative emission control system and a manifold of said automotive vehicle.

14. The method of claim 1 wherein said step of purging said evaporative emission control system is deemed complete upon the expiration of a purge timer.

15. The method of claim 1 further comprising opening a vacuum relief valve coupled to said evaporative emission control system if a pressure within said evaporative emission control system exceeds a given value.

16. The method of claim 1 further comprising opening a vacuum relief valve coupled to said evaporative emission control system if a pressure within said evaporative emission control system drops below a given value.

17. A method of detecting a small or gross leak in an evaporative emission control system of an automotive vehicle comprising:

purging said evaporative emission control system;

sealing said evaporative emission control system;

monitoring a vacuum switch coupled to said evaporative emission control system for an opening event due to a loss of a natural vacuum created in said evaporative emission control system;

determining if a leak check timer has exceeded a first or second predetermined threshold value if said opening event is detected;

conducting an intrusive test of said evaporative emission control system if said leak check timer has not exceeded said first or second predetermined threshold value; and setting a first fault code indicating that said small leak has been detected if said leak check timer has not exceeded said first predetermined threshold value and setting a second fault code indicating that said small gross leak has been detected if said leak check timer has not exceeded said second predetermined threshold value.

18. The method of claim 17 further comprising setting a new fault code if said evaporative emission control system fails said intrusive test.

* * * * *